United States Patent Office 3,232,349
Patented Feb. 1, 1966

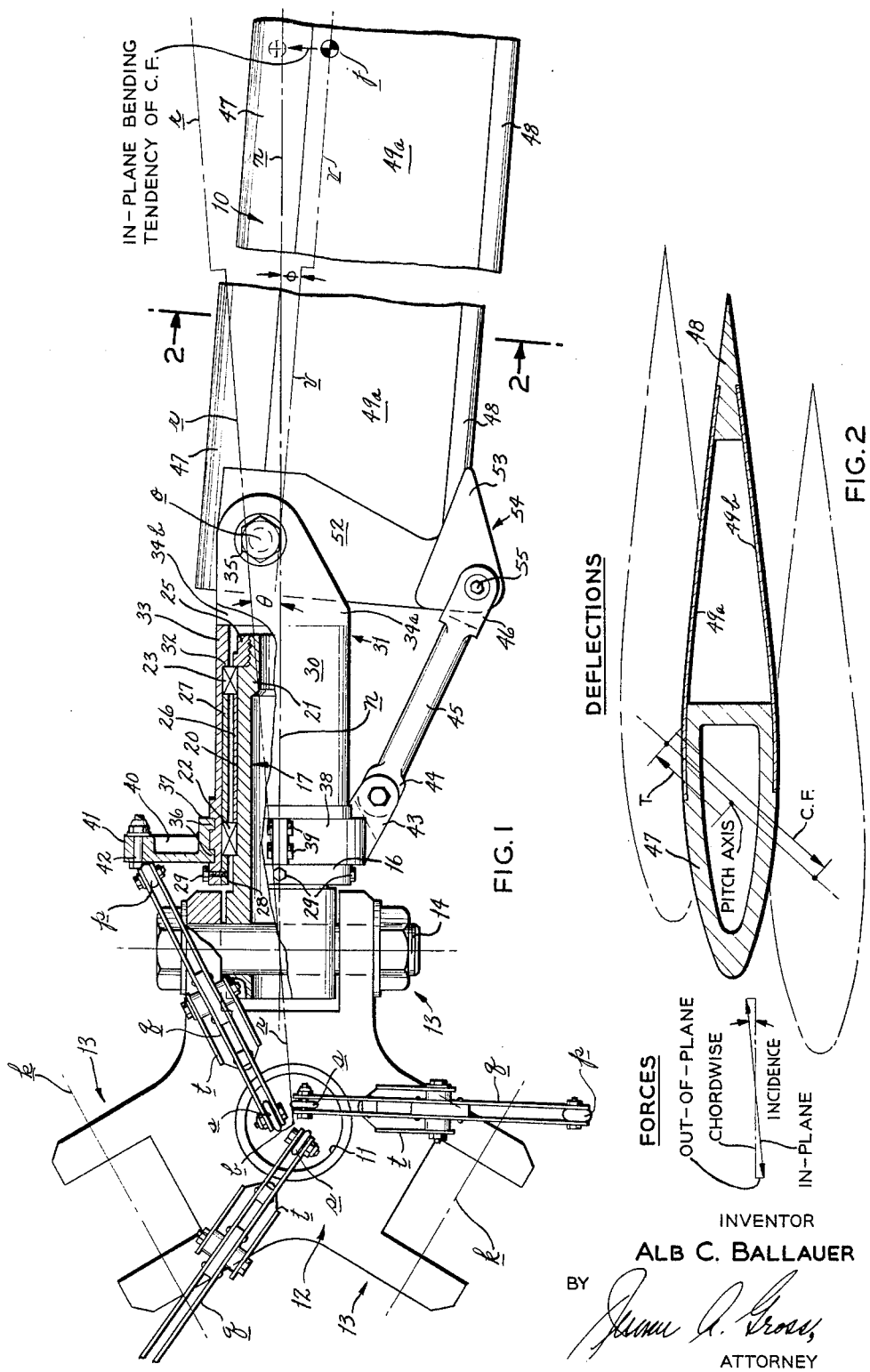

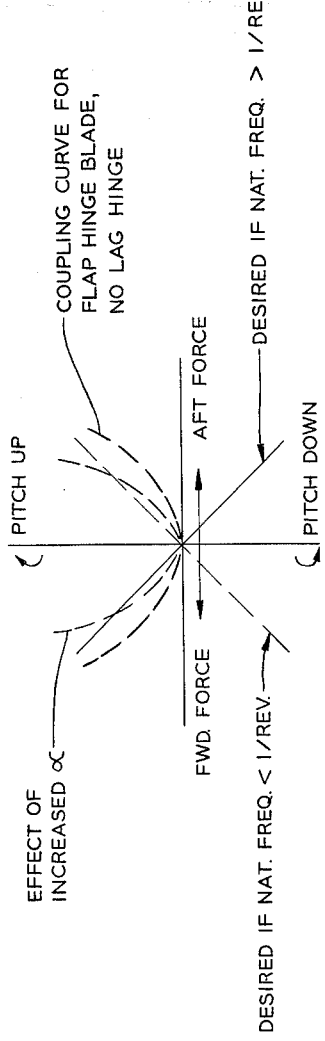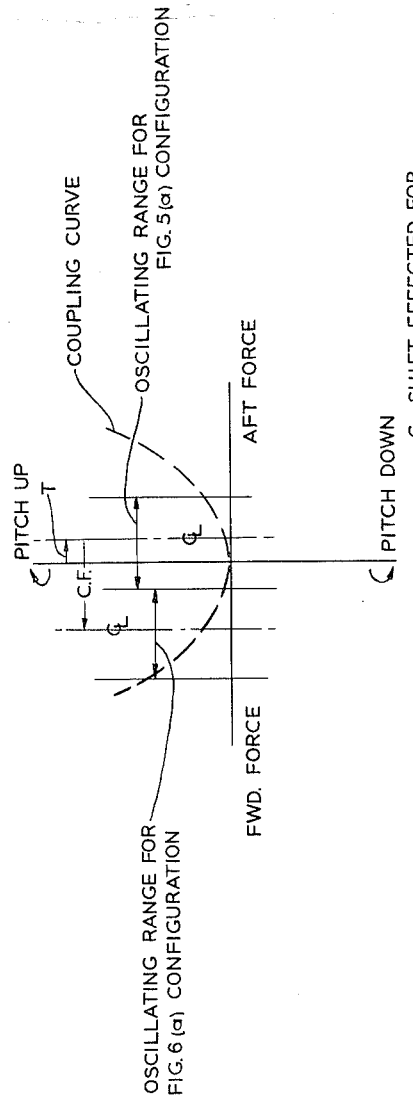

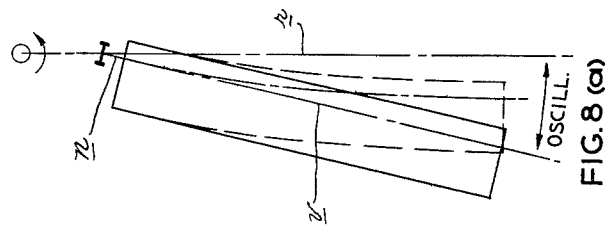
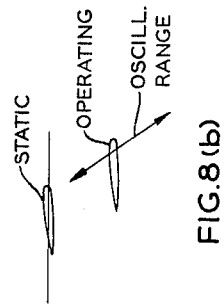
FIG. 8(a)  FIG. 8(b)
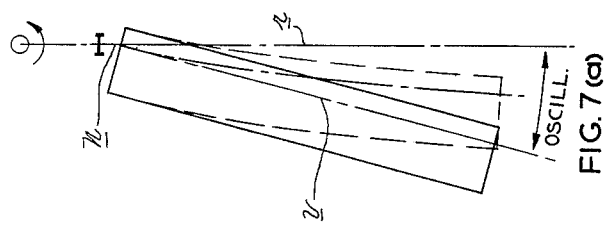
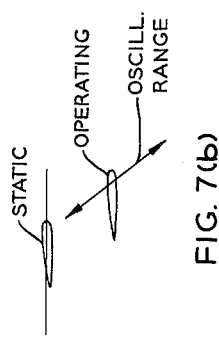
FIG. 7(a)  FIG. 7(b)
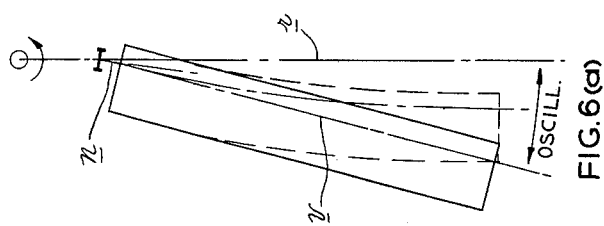
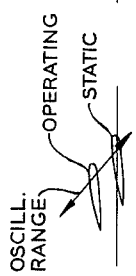
FIG. 6(a)  FIG. 6(b)
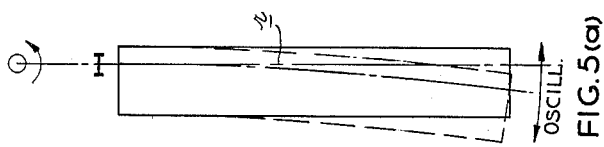
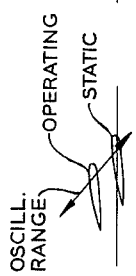
FIG. 5(a)  FIG. 5(b)

3,232,349
ROTOR SYSTEM UTILIZING CENTRIFUGAL DEFLECTION OF NON-RADIAL BLADES
Alb C. Ballauer, Menominee, Mich., assignor to R. J. Enstrom Corporation, Menominee, Mich., a corporation of Michigan
Filed Dec. 2, 1964, Ser. No. 415,532
7 Claims. (Cl. 170—160.25)

The present invention relates to helicopter rotor systems in which the blade roots are hinged to flap with relative freedom but held fixed against leading and lagging in-plane. It is applicable particularly to avoid control force instability which may follow from in-plane oscillations in such a system.

In this specification certain complex, but familiar, engineering concepts are stated as conclusions. To provide detailed scientific explanations of such complex concepts would be beyond the proper scope of this disclosure. The practical explanations included herein are not intended, therefore, to be complete, but rather somewhat simplified and useful to explain some of the more serious interrelated problems encountered, and how they have been solved hereby.

The problem of in-plane vibrations of flapping blades is closely related to the Coriolis forces which are experienced as the flapping blades cone upwardly toward the mast and downwardly back to a position more nearly perpendicular. These Coriolis forces exerted forward and aft on each cycle of rotation of the rotor are a consequence of the radial movement of the blade center of gravity attendant such flapping. Their frequency is the number of revolutions of the rotor in the time period measured.

Rotor blades are essentially springy bending structures. The frequency of their spring-like bending vibrations differs depending on the plane in which such bending vibrations may occur. The fore-and-aft Coriolis forces impose bending vibrations directed perpendicular to the direction of flapping; this is referred to herein as the "in-plane" direction (the term being more precisely related to the theoretical plane in which the rotor blades are, for engineering design purposes, deemed to rotate). Care is therefore taken in the design of helicopter rotor blades that their natural frequency for such "in-plane" bending vibrations will not coincide with the frequency of Coriolis forces.

In flight, helicopter rotor blades are presented at a positive angle of attack to such plane of rotation. We therefore differentiate directions; "in-plane" being in the plane perpendicular to the rotor mast, and "chordwise" being the straight line connecting the leading and trailing edges of the usually symmetrical blade cross-section; the angle between them (which is varied by the pilot-operated pitch control) being the geometrical angle of incidence. There is a similar angular difference between "flapwise," which refers to the direction of angular movement about the flapwise hinge (substantially approximately perpendicular to "in-plane"), and "normal" which refers to a plane perpendicular to chordwise.

In a rotor system where the blades are flap-hinged but have no lag hinges, the blade root ends and their securement provisions must withstand in-plane bending moments. It is useful to consider, as a preferred embodiment of the present invention, blades of "high" in-plane rigidity, the term "high" being defined here as having a natural frequency for in-plane bending which exceeds the design speed of rotor revolutions in the same time interval. Their use is contrasted herein with the use of blades of low in-plane rigidity, that is, those whose natural frequency in-plane is less than design rotor r.p.m.

In order to achieve a desired high in-plane rigidity at a minimum of weight, as in the embodiment of invention herein described in detail, the rotor blades utilized are almost necessarily constructed so that their aft as well as forward portions will contribute to bending stiffness. Such stiffness "chordwise" will be much greater than the stiffness in "normal" bending perpendicular to the blade chordline.

When a blade of these characteristics is presented to the relative wind at a positive angle of attack α (which will not ordinarily coincide precisely with the geometrical angle of incidence), bending forces applied in-plane will deflect the blade out of such plane. Thus, when the blade is subject to the cyclically reversing in-plane Coriolis forces, it will experience bending oscillations alternately upward-and-aft and downwardly-and-forward, at a frequency equal to the number of rotations per time interval.

Although these out-of-plane bending deflections follow from in-plane forces, it is to be remembered that the bending reaction at the root is entirely in-plane; for with the flap-hinged articulation system there can be no flapwise bending reaction at the hinge. The components of force, perpendicular to in-plane, do not bend the blade; applied to each segment of the blade, they cause only a coning tendency which lifts the feathering axis with it and hence has no effect on pitch moments.

Note then this unusual, unobvious circumstance: that the components of force which cause out-of-plane bending deflection are the fore-and-aft in-plane force components.

We now consider how these fore-and-aft components, acting on the blade in its upward or downward deflected position, cause pitching moments about the blade feathering hinge axis. An aft force applied above the feathering hinge axis tends to cause the blade to pitch up. A forward force applied below this axis also causes a pitch up moment. Such moments may cause the blade angle to increase as by overcoming pilot forces or by torsional deflection. When such increase occurs, the increased unsymmetrical bending tendency of the blade at the greater angle α will result in still further upward or downward blade deflection and a still further increase in pitch-up moment.

It may be stated, consistent with principles accepted in helicopter engineering and without further theoretical proof, that for blades of high in-plane rigidity in such a system, the pitch moments around the feathering hinge which accompany forward-and-aft oscillatory forces (as from Coriolis forces) at the rate of one per revolution, should ideally, for control stability, be characterized by increasing upward blade pitch moment with forward forces and decreasing pitch moment with aft forces. Such theoretical desirable ideal curve might be visualized as a line which slopes downward from left to right, as shown in FIG. 3. For a "low" rigidity blade, whose natural frequency was less than one per rev., the desirable slope would be precisely opposite.

Without attempting a detailed explanation, it may be noted merely that by designing the blade so that its in-plane natural frequency does not coincide with the one per rev. rate at which the principal in-plane exciting forces are applied, resonance is avoided; the vibrations which ensue will be in the nature of forced vibrations. The "desirable" slopes referred to represent the conditions wherein the forcing frequency has a damping tendency; the undesirable slopes are those wherein the forcing frequency is not damping but rather the reverse.

We should now consider in greater detail the physical significance of the curves of FIGS. 3 and 4. In practice, if a blade, initially undeflected from the feathering axis, is subjected to alternating forward and aft forces, a curve of its pitch moments is likely to be nearly parabolic, that is, the blade pitch-up moment will increase with an increase in forward force components, and will also increase with an increase in aft force components. This results from the fact that the forward force acts on the blade when deflected below the pitch axis, and the aft force on it when deflected above the pitch axis; in both cases the pitch moment is up.

The coupling curve—that is, the relation between forward and aft oscillatory forces and the blade pitch moments so described—is plotted in FIG. 3 for an assumed positive blade angle of attack α. The curvature of this substantially parabolic curve will change with increasing blade angle; if the blade pitch-up tendency is not overridden by the pilot's control and the blade angle in fact increases, the parabola would be narrowed.

FIG. 4 includes such a coupling curve, marked with specific oscillating ranges. Since fore-and-aft force components, as from Coriolis forces, can be predicted, the range of pitch moments resulting from these oscillatory forces can be marked with vertical lines on the coupling curve.

Without utilizing the present inventive concept, a mast-driven rotor operates with its blades driven slightly aft of radial. Aerodynamic drag represents an aft force to be overcome by the torque of the engine. Where the rotor articulation includes no lag hinges, the in-plane torque results in out-of-plane bending deflection and pitch-up moment, as heretofore described.

The inventor knows of no actual flap-hinged rigid in-plane rotor so constructed except the work in which the inventor participated preliminary to making the present invention. Therefore, the precise nature of pitch moments in such a system may not be generally understood.

Under design conditions the torque is a known steady force, and the accompanying aft deflection brings the blade to an aft deflected center position. The fore-and-aft Coriolis forces then cause oscillations about this center position. Such aft shift of center due to torque is designated on FIG. 4 by the letter T. The range of pitch-up moments which will thereafter accompany the fore-and-aft oscillations from Coriolis forces is marked by the vertical lines on both sides of this shifted "centerline." As shown in FIG. 3, the oscillating range for pitch moments to which the center is thus shifted, is not a desirable range.

The slope of the parabolic curve within this range is upward with increasing aft force. This is the reverse of the trend desired for blades whose natural frequency is greater than one per rev. In this segment of the curve, vibratory oscillations will not be accompanied by a wholesome damping. The tendency of the blade to increase its angle of attack responsive to the pitch-up moments will therefore tend to narrow the parabolic curve (as schematically shown in FIG. 3). Oscillating deflections on such a narrowed curve will be increasingly dangerous.

The purpose of the present invention is essentially to achieve stability of the pilot control forces. In the present invention this is achieved by setting the blades statically so that they are non-radial, and utilizing the centrifugal forces attendant to rotation to hold them deflected from in-plane. As applied to a blade of "high" rigidity, the setting is such that centrifugal force causes forward in-plane bending which, when the blades are presented at positive lifting angles, will bend them curvingly downward as well as forward. This displaces the centerline of oscillatory deflection in the amount designated C.F. in FIG. 4, to a new, preferred "centerline" position to the left of center of the pitch moment parabola. The oscillatory range is thus displaced to the desired side of the pitch moment curve wherein forward oscillatory forces result in increased pitch-up moment and aft forces result in diminished pitch-up moment.

As applied to the system consisting of the high rigidity blades and hub hingedly articulated in the manner mentioned, the present invention may be described as so coupling each blade to the articulated hub, statically, as to position its twist axis behind alignment with a radial from the mast through the flapping hinge. Centrifugal force attendant to rotation will tend to urge the blade forward toward a position of radial alignment; such tendency being reacted at the flapping hinge by a purely in-plane moment. The bending which ensues is a forward and downward out-of-plane deflection. So deflected, the blade is centered for oscillatory vibrations which may ensue within the favorable range of the pitch moment curve.

By the term "twist axis" is meant the spanwise blade axis which is in effect defined by chordwise centers of gravity of blade cross-sections taken successively along the blade span.

As a matter of good design practice, helicopter rotor blades are conventionally constructed so that the blade section centers of gravity and centers of twist substantially coincide at the intersection of the principal structural axes for unsymmetrical bending; and the center of gravity of the blade as a whole is along such twist axis.

For purposes of this specification, the centrifugal forces are considered with reference to a radial from the mast through the center of the flapping hinge, (whose flapping axis may be either tangential or somewhat offset, as later described). The purpose for selecting such a radial as a reference line will be evident when it is realized that the clevis or other structure of the flapping hinge restrains the blade from in-plane swinging; and only at the flapping hinge can it be known that out-of-plane bending moments must be zero.

For a blade of "low" rigidity (whose in-plane natural frequency is less than design r.p.m.), the static setting would be such as to put the blade center of gravity in advance of such a radial line. Centrifugal force would then tend to bend the blade backward and up. For such a low rigidity blade, however, the in-plane bending stiffness is likely to be more nearly equal to the bending stiffness perpendicular to in-plane. Hence, the detailed description which follows deals specifically with utilizing high rigidity blades.

The manner of constructing and utilizing the present invention is more fully set out in the following specification which refers, for illustration, to the drawings hereto, in which:

FIG. 1 is a plan view, partially fragmentary and partly sectional, of a helicopter rotor system embodying the present invention; and FIG. 2 is a view of a typical blade cross-section taken along line 2—2 of FIG. 1. The phantom lines indicate how such cross-sections will bend oscillatingly under the reversing in-plane forces shown in the vector diagram.

FIG. 3 is a graph showing desirable variations of pitch-up moment during in-plane blade oscillatory motions for blades of high and low in-plane rigidity, contrasted with actual parabolic variations experienced for blades which flap but have no lag hinges.

FIG. 4 is a graph illustrating how centrifugal forces used as taught herein will so bend the blade as to shift the range in which the oscillatory motions occur, to a more desirable portion of the parabolic curve.

FIG. 5a is a plan schematic layout of a rotor system not utilizing the present invention, with simple radial rectilinear alignment of a blade axis and feathering hinge axis with each other; this layout illustrates the aft bending deflection experienced due to torque in actual lifting flight, and the resulting undesirable aft range of the blade oscillatory motion; and FIG. 5b is an elevational sketch corresponding to the FIG. 5a plan view, showing the bending deflection upward as well as aft of an outboard or tip portion of the blade of such embodiment, from static position to center of such undesirable range of oscillatory motion.

FIG. 6a is a plan schematic layout of the rotor system embodied in FIG. 1, in which both blade sweep and feathering hinge axis cant (or "hinge offset") are utilized, illustrating the forward deflection of such a blade under centrifugal force and the desirable forward range of its oscillatory motion; and FIG. 6b is an elevational sketch corresponding to FIG. 6a and showing the blade tip's downward as well as forward deflection from static position to center of such desirable range of oscillatory motion.

FIG. 7a is a plan schematic view like that of FIG. 6a of a different embodiment of a rotor system, in which the feathering hinge axis is radial and the blade axis is swept aft; and FIG. 7b is an elevational schematic view, like that of FIG. 6b, for the FIG. 7a embodiment.

FIG. 8a is a view like that of FIG. 6a of a still further embodiment in which the flapping hinge cants the feathering hinge axis to sweep it as well as the blade aft of such a radial; and FIG. 8b is an elevational schematic view, like that of FIG. 6b, for the FIG. 8a embodiment.

An articulated helicopter rotor system (the embodiment of the present invention illustrated in FIGS. 1 and 2) will first be described in its structural details; thereafter will be presented an explanation of the remaining figures, from which the operation and scope of the present invention will be apparent.

The rotor system shown utilizes three lifting blades, generally designated 10. A hollow mast 11, mounted rotatably with respect to the vertical mast axis $b$ has a rotor hub 12 fixedly secured to it so that the hub 12 rotates perpendicularly to it (that is, not free to tilt or teeter). The hub 12 has three flapping hinge provisions generally designated 13; here each is a clevis hinge positioned offset in advance of rotation of the mast 11, and having an aft-canted flapping hinge line $k$ lying in the plane perpendicular to the mast 11. The hinge line $k$ serves to cant the feathering hinge provision rearwardly at a small angle $\theta$, from a radial line $r$ from the mast to the midpoint of the clevis 13. There is no hinge for lagging; the system is "rigid in-plane."

Mounted hingedly on the hinge lines $k$ as by flapping hinge bolts 14, are the hinged inner spindle end portions 16 of rigid, hollow, blade feathering hinge spindles generally designated 17. The hinge spindle axis $n$ projects aft from the radial $r$ at the ange $\theta$ as shown in FIG. 1. For purpose of permitting blade "feathering" pitch change movements about the spindle axis $n$ and yet resist bending moments, each of the spindles 17 has an inner bearing mounting portion 20 and an outer bearing mounting portion 21, spaced from each other. Inner and outer bearings 22, 23 of the radial-thrust resisting type are here mounted.

At its outer end the spindle 17 is threaded to receive a thrust nut 25, which resists the centrifugal force exerted by the blade 10. The nut 25 bears against the inner races of the outer bearing 23; and an inner thrust spacer 26 acts between it and the inner race of the bearing 22. The outer races of the bearings 22, 23 acting together through the outer thrust spacer 27, impose the blade centrifugal load on the bearings 22, 23 by an annular end spacer 28, secured by bolts 29 at and within the inner end of a rigid hollow cylinder or cup portion 30 of the spindle-mounted blade grip member which is generally designated 31, which terminates at its spanwise-outer end in a pair of rigid, yoke-like, parallel upper and lower grip members 34a, 34b, provided with bores aligned along a blade grip axis $o$ which receive the principal blade grip bolt 35.

The inner surface of the cylinder portion 30 receives the outer races of the bearings 22, 23 as well as their outer spacer 27, between the annular end spacer 28 described and a shoulder 32 demarking a portion 33 of slightly reduced inner diameter which projects inwardly within the inner wall of the hollow cylinder portion 30. In this portion is accommodated the thrust nut 25. The blade grip member 31 is thus mounted by the bearings 22, 23 for pitch change movement (that is, relative rotation through the required pitch-change angle) about the axis $n$.

At the inner end of the cylinder portion 30, rigidly clamp-mounted in annular spaced grooves 36, is a forward half-ring 37 and aft half-ring 38, connected by clamping bolts 39. The forward half-ring 37 includes an integral forward-projecting pitch control arm 40 having an end boss 41 bored to mount a bolted-on connector 42 pivot-connected to an upwardly-extending pitch control link $p$ whose upper end is pivot-connected to a rocker arm $q$ fulcrum-mounted on a bracket $t$ secured to the top of the hub 12 and actuated by a push-pull control rod $s$ which extends upwardly through the hollow mast 11. Downward and upward movements of the rod $s$ (controlled by the pilot through a swash plate or equivalent mechanism located beneath the rotating mast) raise and lower the pitch link $p$, and hence cause the blade grip member 31 to increase or lessen its pitch, moving rotatively about the axis $n$ over an angular range sufficient to effect the required collective and cyclic pitch changes.

The aft half-ring 38 has, projecting from its middle, a clevis lug 43 bored to receive and hold the spanwise-inner bolted connector end 44 of a short, rigid trailing edge connector bar 45. The bar 45 has a spanwise-outer clevis end 46 which transmits the forces built up at the trailing edge of the blade structure, as hereinafter described.

To achieve in-plane rigidity of the rotor system, the rotor blade 10 must also have suitable chordwise rigidity, especially in that portion between the center of gravity $j$ and the root end wherein the in-place movements are greatest. As shown in the typical sectional view, FIG. 2, suitable blade structure may consist principally of a heavy extruded aluminum D-shaped tubular spar 47 which extends for the full span of the blade; a solid arrowhead-shaped extruded aluminum trailing edge member 48 which preferably extends the full length of the blade and at least from its root end outward as far as its center of gravity $j$; and structurally continuous, shear-resistant metal upper and lower skins 49a, 49b. The skins 49a, 49b may be pre-formed to the desired curvature, and are bonded into recessed portions of the spar 47 and the trailing edge arrowhead member 48, the depth of recessing being such as will present the skins 49a, 49b at the airfoil mold line. If the blade's chord length is relatively short (say, less than one foot, no intermediate ribs or former members may be required to preserve the airfoil contour.

In the rigid blade construction shown in cross-section FIG. 2, the trailing edge 48 and rear margins of upper and lower skins 49a, 49b are so adheringly joined as to serve as a beam chord which resists chordwise bendings, acting in opposition to the spar 47. When the leading and lagging moments are present, these structural portions at the spar and trailing edge serve alternately as compression and tension chords, in the manner of a box beam. The skins 49a, 49b are sufficiently wrinkle-resistant to build up increments of axial loading on these beam chords.

External upper and lower root end skin doublers 52 are adhered onto the outer surface of the blade 10 at its root; these extend over the trailing edge line. On top of them, near and over the trailing edge line, is secured a pair of upper and lower trailing edge fitting plates 53, obtuse-angled at the trailing edge line. These and the skin doublers 52 project taperingly outward of the trailing edge member 48 to form a trailing edge load transfer fitting, generally referred to as 54. The fitting 54 is bored vertically to receive a trailing edge attach bolt 55 which holds securely the outer clevis end fitting 46 of the connector bar 45. The bar 45 transmits its load axially as shown, to the clevis lug 43 of the aft half-ring 38 on the cylinder portion 30 of the grip member 31.

Coacting with this axial load to react the in-plane bending movement is the principal blade grip bolt 35 in the upper and lower grip members 34a, 34b. Thus, the in-plane root end loads are transmitted into the articulation system with great chordwise ragidity.

The blade 10 may be deemed to have a twist axis $v$; such twist axis will normally be at the 25% chord point, coinciding with the centers of gravity taken at successive cross-sections along the blade span. When the blade is not in rotating operation, these successive cross-sections will be aligned statically in a straight line along the chordline of the blade and at the 25% chord point.

Under prior practice, such blade twist axis would ordinarily be aligned statically with the feathering hinge axis and such hinge axis with radial, as in FIG. 5a. In the present case, however, the feathering hinge axis $n$ and blade twist axis $v$ are not aligned either with each other or with the radial reference line $r$; instead, the FIG. 1 illustration shows the blade twist axis $v$ to be "swept back" from the feathering hinge axis at the angle $\phi$. The blade center of gravity is thus positioned statically aft of the feathering hinge axis $n$ and even farther aft of the radial reference line $r$.

For a general case, the present invention may be considered as employing the flap-hinged, no lag hinge articulation, so that statically, the blade twist axis will be swept statically aft of the radial $r$ (where blades of high rigidity are utilized). This principle is common to the three embodiments of FIGS. 6, 7 and 8, as will be explained. If blades of low rigidity were used, the sweep would instead be forward of radial.

The effect of centrifugal force is illustrated in part in the plan view, FIG. 1. The in-plane bending tendency of centrifugal force urges the blade center of gravity forwardly toward the radial $r$. Knowing the magnitude of the centrifugal force at design rotor speed, and the in-plane bending stiffness, the sweep angle $\phi$ is set so that under centrifugal force the blade center of gravity will move forward as the blade bends, to a position at or near the pitch change axis $n$, as shown in FIG. 1. In-plane vibratory oscillations will occur about such position as a center in some range between the original position $v$ and the radial $r$, as shown in FIG. 2.

FIG. 6 is a schematic plan view of this embodiment. With the blade twist axis $v$ statically aligned to be aft of the radial $r$, the centrifugal force will include components acting on the blade mass, which subject the blade to in-plane bending. This brings the outboard portions of the blade curvingly forward to a new "centered" position for oscillatory vibrations.

Without such centrrifugal force effects, the actual centered position for oscillatory movements would not be the alignment in which the blade is set statically. When the pitch of the blade 10 is set at lifting angle $\alpha$, shown in the diagram at the left side of FIG. 2, in-plane forces such as torque reacted by a simple in-plane bending reaction at the flapping hinge, will result in out-of-plane bending deflection. Under steady operating torque at design rotor speed, the blade tip portion is thus deflected upward and aft as shown in the upper phantom outline in FIG. 2. Such out-of-plane deflection may be very large, due to the unsymmetrical bending characteristics of a "rigid" blade.

Referring to FIG. 5a, if the blade twist axis and feathering hinge axis were aligned statically as there shown, torque would deflect the blade to move its tip to a new centered position shown in FIG. 5b. Vibratory oscillations would then occur in the range indicated on the right side of the FIG. 1 curve, where its parabolic slope is similar to the undesirable operating condition line shown in FIG. 3.

Applicant recognized that if it were possible to exert a steady in-plane force to deflect the outboard portion of the blade downward, as in the lower phantom outline of FIG. 2, this would shift the oscillation range to a new centered position on the left side of the FIG. 4 curve; and that the pitch-up moments would then vary in a manner closely approximating the "stable" curve of FIG. 3.

This is the precise result of the present invention. The forward and down bending deflection from the steady centrifugal force overcomes the upward and aft deflection tendency of torque as schematically shown in FIGS. 6a and 6b. The blade has been physically brought curvingly to a position in which its twist axis is centered in a desirable location, considering the effect of blade oscillations on blade pitch moment. Further in-plane excitations will cause oscillations from such position as shown by the two-headed arrow of FIG. 6b, forward-and-downward, and upward-and-aft, generally between the static position of the twist axis $v$ and the radial $r$.

The physical appearance of such curved centered position, and the physical range of such oscillatory movements about such center, is schematically shown in the plan view FIG. 6a. As a result, the vibratory response at blade frequency (greater than one per revolution) to in-plane Coriolis forces at rotor speed frequency, no longer threatens the stability of blade pitch-up moment which the pilot must control.

The configurations shown schematically in FIGS. 7a and 8a will now be considered. In the FIG. 7a configuration, the feathering axis coincides with the radial $r$ from the mast but the blade is swept aft at an angle so that in static position its outboard portion is aft of radial. Accordingly, centrifugal forces on the blade mass will tend to deflect the blade forwardly, bending it in planform as shown in FIG. 7a. The downward component of bending deflection which accompanies the forward deflection is illustrated in FIG. 7b. Hence, the blade will, when operated at design speed of rotation in ordinary lifting flight, be deflected forward and down to a new preferred center position about which the oscillatory movements will take place, their range being indicated schematically in FIG. 7a.

The embodiment of FIG. 8a is another variation in alignment; specifically, the feathering hinge axis $n''$ is canted as in the FIG. 1 embodiment, but at a slightly greater angle from the radial $r''$. Statically the blade twist axis $v''$ is aligned rectilinearly with the feathering axis $n''$. Centrifugal force acting on the blade's unsymmetrical bending characteristic will result in a deflecting displacement forwardly and down to a new centered position for oscillatory movements, as shown in FIG. 8b.

In these illustrated embodiments, centrifugal forces cause downward bending curvature because of the previously discussed combination of features: the blade has unsymmetrical bending characteristics; it is presented at a positive angle of attack; it is free to cone at its flap hinge but it is there rigidly restricted in-plane; and statically it has been so set, with its twist axis out of radial alignment, as to sweep its center of gravity aft of radial $r$.

The reference herein to bending curvature so that deflection is downward (in the out-of-plane direction) is a convenient way of speaking of the curvature tendency where the tip is deflected downward relative to the pitch axis at the root. In considering the actual physical displacements, it is to be remembered that the blade cones at the root from the interaction of lift and centrifugal force. Hence, the static sweeping of a "rigid" blade aft of radial, so that unsymmetrical bending from centrifugal force includes a curvature downward from root to tip, may result in a slight compensating increase in the coning angle at the blade root.

For blades of low in-plane rigidity, mounted in a generally similar articulation, the static setting of the blades would be reversed to result in the centrifugal force acting at design r.p.m. to bend the blade deflectingly upward and aft and reset the center of the oscillatory range well to the right side of the parabolic curve of FIG. 1, as is desirable for a blade of low in-plane rigidity.

In utilizing the inventive principles here disclosed, other specific design variations will occur to those skilled in the art. Accordingly, this invention is not to be construed narrowly but rather is coextensive with the claims hereof.

I claim:
1. A helicopter rotor system adapted to avoid control force instability attendant to in-plane oscillations, comprising
   a mast;
   a plurality of blades whose chordwise centers of gravity, taken at successive cross-sections along the blade span, are statically aligned to define a straight twist axis; whose chordwise bending stiffness exceeds their bending stiffness perpendicular to chordwise; and whose natural frequency of in-plane vibration is greater than the number of revolutions in the same time period at design speed of rotation;
   an articulated hub holding the blade roots rigidly against in-plane leading and lagging, said hub including for each blade a flapping hinge and a feathering hinge outboard thereof and at the inboard end of the blade twist axis;
   means to apply pilot control movements to move each blade angularly about its feathering hinge;
   and root retention means securing each blade to the articulated hub to position its twist axis statically out of radial alignment with the mast, so as to be behind a radial line from the mast through the intersection of the feathering axis with the flapping hinge;
   whereby centrifugal force attendant to rotation deflects the blades, when presented at a positive lifting angle, forward and downward to a preferred center position for oscillatory vibrations.

2. The rotor system defined in claim 1, wherein the axis of each feathering hinge is radial to the mast, and the spanwise outboard portion of each blade, in static position, sweeps aft of said feathering hinge axis.

3. The rotor system defined in claim 1, in which the blade twist axis is aligned with the axis of its feathering hinge and, in static position, sweeps aft from the radial line through the intersection of the feathering axis with the flapping hinge.

4. The rotor system defined in claim 1, wherein the axis of each feathering hinge sweeps somewhat aft from the radial line through the flapping hinge, and the blade twist axis outwardly therefrom sweeps further aft from said hinge axis to position the blade center of gravity statically aft of such radial line.

5. A helicopter rotor system adapted to avoid control force instability attendant to in-plane oscillations, comprising
   a mast;
   a plurality of blades whose chordwise centers of gravity, taken at successive cross-sections along the blade span, are statically aligned to define a straight twist axis;
   an articulated hub holding the blade roots rigidly against in-plane leading and lagging, said hub including for each blade a flapping hinge and a feathering hinge at the inboard end of the blade twist axis to which the blade is secured by a root retention;
   and means to apply pilot control movements to move each blade angularly within its feathering hinge;
   characterized in that
   the hub and root retention position each blade so that its twist axis is statically out of alignment with the radial line from the mast through the intersection of the feathering axis with the flapping hinge;
   whereby the static departure from such radial alignment is set dependent upon the relation of the blade natural frequency to the design speed of rotation, so that such twist axis is behind the radial for blades whose nautral frequency exceeds one per revolution and in advance of the radial for blades whose natural frequency is less than one per revolution.

6. A helicopter rotor system adapted to avoid control force instability attendant to in-plane oscillations, comprising
   a mast;
   a plurality of lifting rotor blades whose bending stiffness chordwise exceeds the bending stiffness in the plane perpendicular to chordwise;
   an articulated hub including for each blade a flapping hinge which holds the blade rigidly against in-plane leading and lagging, and a feathering hinge outboard of the flapping hinge; and
   means to apply pilot control movements to change the blade pitch angularly within its feathering hinge;
   characterized in that
   the root retention means positions each blade so that its center of gravity is statically behind a position of alignment with a radial line from the mast through the intersection of the feathering axis with the flapping hinge;
   whereby centrifugal force attendant rotation which urges the blade toward a position of alignment with such radial line and is resisted at the flapping hinge by in-plane bending, results at positive blade pitch angle in forward and downward out-of-plane deflection to an operating center position for oscillatory vibrations, thereby yielding desirable pitch moments about the flapping hinge.

7. A helicopter rotor system adapted to avoid control force instability attendant to in-plane oscillations, comprising
   a mast;
   a plurality of blades whose bending stiffness chordwise exceeds the bending stiffness in the plane perpendicular to chordwise;
   an articulated hub including for each blade a flapping hinge outboard of the mast which there holds the blade rigidly against in-plane leading and lagging;
   means to apply pilot control movements to change the blade pitch within its feathering hinge;
   characterized in that
   the root retention means positions each blade so that its center of graivty is statically out of alignment with a radial line from the mast through the intersection of the feathering axis with the flapping hinge;
   whereby the static departure from radial alignment is set dependent upon the relation of the blade natural frequency to the design speed of rotation, so as to be behind alignment with such radial line for blades whose natural frequency exceeds one per rev., and in advance of alignment with such radial line for blades whose natural frequency is less than one per rev.,
   so that excitations occurring once per revolution tend to damp the blades' oscillatory response thereto at natural frequency.

References Cited by the Examiner
UNITED STATES PATENTS

| | | | |
|---|---|---|---|
| 2,110,638 | 3/1938 | Synnestvedt | 170—160.57 X |
| 2,499,314 | 2/1950 | Hunt | 170—160.57 X |
| 2,731,215 | 1/1956 | Avery | 244—17.13 |

MARK NEWMAN, *Primary Examiner.*

W. E. BURNS, *Assistant Examiner.*